(12) United States Patent
Tsuboi (10) Patent No.: US 7,661,831 B2
(45) Date of Patent: Feb. 16, 2010

(54) RUBBER FOOT MOUNTING STRUCTURE AND PROJECTOR

(75) Inventor: Tomoaki Tsuboi, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 347 days.

(21) Appl. No.: 11/800,696

(22) Filed: May 7, 2007

(65) Prior Publication Data

US 2007/0263180 A1    Nov. 15, 2007

(30) Foreign Application Priority Data

May 9, 2006    (JP)    ............................. 2006-130147

(51) Int. Cl.
| G03B 21/14 | (2006.01) |
| A47B 91/06 | (2006.01) |
| F16L 39/00 | (2006.01) |
| F21L 23/00 | (2006.01) |
| A47G 29/00 | (2006.01) |

(52) U.S. Cl. ........................ 353/119; 353/122; 16/42 T; 285/124.4; 285/98; 285/408; 248/688

(58) Field of Classification Search ................. 353/119, 353/122; 16/42 R, 42 T; 285/124.4, 98, 285/363, 405, 408; 361/752; 248/688
See application file for complete search history.

(56) References Cited

U.S. PATENT DOCUMENTS 2,644,978 A    7/1953    Becker

2005/0185386 A1*    8/2005    Okoshi et al. ............... 361/752
2007/0211229 A1*    9/2007    Kitahara ...................... 353/119

FOREIGN PATENT DOCUMENTS

| GB | 799978 A | 8/1958 |
| GB | 1300035 A | 12/1972 |
| JP | 03-004596 | 1/1991 |
| JP | 10-270863 | 10/1998 |
| JP | H10-270863 A | 10/1998 |
| JP | 2002-009454 | 1/2002 |
| JP | 2002-009454 A | 1/2002 |

OTHER PUBLICATIONS

The extended European search report includes, pursuant to Rule 62 EPC, the European search report (R.61EPC) or the partial European search report/ declaration of no search (R.63 EPC) and the European search opinion.

* cited by examiner

*Primary Examiner*—Georgia Y Epps
*Assistant Examiner*—Magda Cruz
(74) *Attorney, Agent, or Firm*—Yokoi & Co., U.S.A., Inc.; Peter Ganjian

(57) ABSTRACT

The rubber foot mounting structure has a base 20b equipped with a boss hole 30 in the shape of substantially a cylinder and a rubber foot 40 that is formed on an outer side face of a body section 40d in the shape of substantially a column and is made capable of being press-fit to the boss hole 30 by means of flanges 40a1 to 40a4 formed on the outer side face of the body section 40d. Four flanges 40a1 to 40a4 formed on the outer side face of the rubber foot 40 contact the boss hole 30 and the rubber foot 40 gets inserted into the boss hole 30 while the four flanges 40a1 to 40a4 are being compressed.

7 Claims, 10 Drawing Sheets

PRIOR ART

RUBBER FOOT MOUNTING STRUCTURE AND PROJECTOR

CROSS-REFERENCES TO RELATED APPLICATIONS

The present application is related to Japanese Patent Application No. 2006-130147, filed May 9, 2006, the entire disclosure of which is expressly incorporated by reference herein.

BACKGROUND OF THE INVENTION

1. Field of the Invention

This invention relates to a rubber foot mounting structure and a projector equipped with the rubber foot mounting structure.

2. Description of the Related Art

Figure 10:
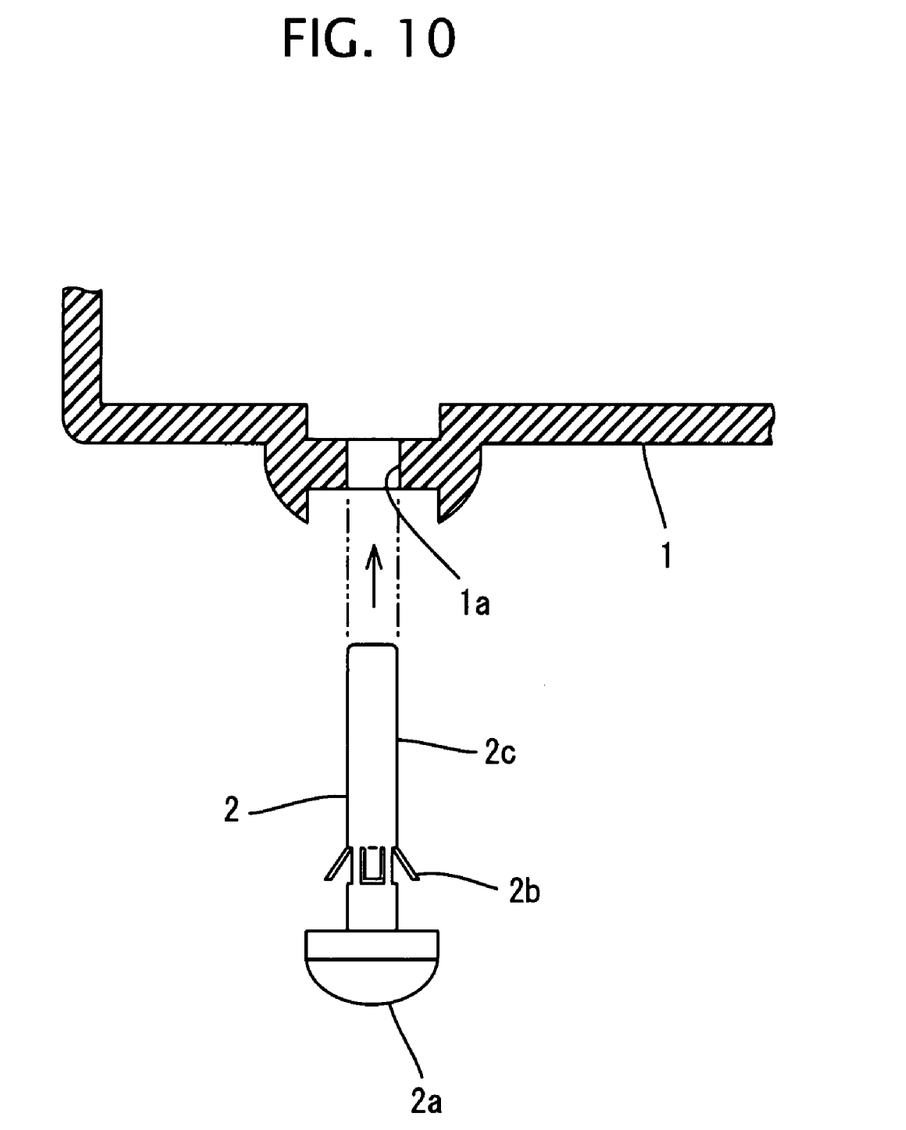
FIG. 10 is a diagram showing the rubber foot mounting structure in the conventional projector.

The conventional projector adopted a rubber foot mounting structure as shown in FIG. 10. That is, a round hole 1a is opened in a bottom case 1, a thrusting rod 2c of a rubber foot 2 with a rubber head 2a fixed on its tip is threaded through the round hole 1a, from the viewable face side to the inside, and the thrusting rod 2c is fixed to the round hole 1a with a backward blocker 2b. With this structure, the rubber head 2a protrudes to the below from the undersurface of the bottom case 1, and the rubber head 2a keeps the bottom case 1 at a predetermined height.

As a mounting structure of a rubber foot that is attached on the undersurface of the electric/electronic appliance including the projector, holds the electric/electronic appliance at a predetermined height, and gives the electric/electronic appliance a buffering function, the following is disclosed. That is, JP No. 03-4596 A discloses a rubber foot such that a trench is provided in the rubber foot, a frame is set in the rubber foot, and a base housing is fastened using a protrusion provided on the rubber foot. Moreover, JP No. 10-270863 A discloses a leg for electric appliance such that a rubber foot provided with a through hole in its core is press-fit to a pin provided in the bottom of the electric appliance and a side face of the rubber foot is covered with a cylindrical rib provided in the perimeter of the pin. Furthermore, JP No. 2002-9454 A discloses a rubber foot mounting structure such that a trunk of the rubber foot is provided with a hole and a protrusion, when the rubber foot is inserted into an insertion orifice of the rubber foot, the rubber foot is tacked by the protrusion, and the rubber foot is fixed by inserting a rib into the hole at the time of assembly.

However, since in the conventional rubber foot mounting structure, the thrusting rod 2c and the backward blocker 2b protrude from the undersurface of the bottom case 1 to the top face in the conventional rubber foot mounting structure, if this structure is applied to an appliance whose pedestal part is independent, the thrusting rod 2c and the backward blocker 2b protrude from the top face and are exposed.

Moreover, a rubber foot described by JP No. 03-4596 A is unsuited to be used for an appliance whose pedestal part is self-supporting because a part thereof protrudes above the top face of a base housing. Further, the protrusion part must support the whole weight of the base housing, and it is unsuited to be used in an appliance with a heavy weight.

Still moreover, a leg for electronic appliance described by JP No. 10-270863 A has the following unsatisfactory problem: when the pin is inserted into a through hole for fixing of a rubber foot, if the diameter of the hole for fixing is excessively large to the diameter of the pin, the rubber foot is easy to fall out of the pint; there are troubles that, if the diameter of the through hole for fixing is formed to be somewhat smaller than the diameter of the pin, it becomes difficult to perform press-fit smoothly and once the pin is set in the hole, it becomes hard to remove.

Even moreover, a rubber foot mounting structure of an enclosure described by JP No. 2002-9454 A is unsuited to be applied to an appliance whose pedestal part is self-supporting because a part of the rubber foot protrudes above the top face of the case. Further, once the enclosure is assembled, in order to remove the rubber foot, the rib must be removed; and then in order to remove the rib, the enclosure must be dissembled. So, this structure gives poor workability in the case of removing the rubber foot, such as in rework in which the rubber foot is removed, for example, because the pedestal is found defective in a factory.

BRIEF SUMMARY OF THE INVENTION

This invention provides a rubber foot mounting structure that eliminates the need to provide a hole etc. on a viewable face of a target appliance and allows a rubber foot to be mounted on an enclosure of an appliance so as not to expose a component on the viewable face and to be secured, and a projector with the same.

The rubber foot mounting structure adopts a structure that consists of a boss hole in the shape of substantially a cylinder (cylindrical cavity) and a rubber foot that can be press-fit into the boss hole by means of a plurality of protrusions formed on an outer side face of a body section in the shape of substantially a column. That is, the plurality of protrusions formed on the outer side face of the rubber foot contact the boss hole, and the rubber foot gets inserted into the boss hole while the plurality of flanges are being compressed. Therefore, a frictional force will work between the plurality of protrusions and the boss hole and enable the rubber foot to be mounted and secured. It is natural that, as the shape of the boss hole, cylindrical shapes of polygons, such as a rectangle and a hexagonal, may be used other than substantially a cylinder.

An optional aspect of the present invention provides a rubber foot mounting structure that doses not expose a component associated with the rubber foot on the viewable face of the enclosure including the pedestal.

Another optional aspect of the present invention, since the protrusion is formed in the shape of a flange, the frictional force working between the boss hole and the rubber foot becomes symmetrical with respect to the bottom face of the rubber foot, and accordingly a work of setting the rubber foot in the boss hole becomes easy. Further, the shape of a die to mold the rubber foot becomes simple.

Another optional aspect of the present invention provides the rubber foot mounting structure becomes a structure in which the rubber foot is easy to deform against a load imposed on the rubber foot vertically, and will give the rubber foot a buffering function. Therefore, this rubber foot can protect articles that adopt the rubber foot mounting structure of this invention and can prevent its breakage.

Another optional aspect of the present invention, it becomes possible to visually check the ring-shaped depression through the slit. Therefore, when a member in which the boss hole is formed becomes defective in a factory and rework of removing the rubber foot occurs, it becomes easy to remove it. Moreover, if the ring-shaped depression is formed continuously from the undersurface of the flange-shaped protrusion located higher than the ring-shaped depression and continuously from the top face of the flange-shaped protrusion located lower than the ring-shaped depression, respectively, a surface of a length equal to the depression depth of the ring-shaped depression plus the protrusion height of the flange-shaped protrusion is formed, and a pair of tweezers, when it is inserted in the course of rework, an area that the tweezers contact can be secured as wide as possible.

Another optional aspect of the present invention, the structure gives a standard as to whether the rubber foot is inserted sufficiently in the boss hole, and it is suitable for assembly. The structure makes it possible to check troubles, such as a case where the rubber foot is inserted slantingly, i.e., it is inserted sufficiently on one side but is inserted insufficiently on the other side. Since the protrusions are provided at positions that substantially agree with an opening edge of the boss hole, this structure is a structure in which, when stress is imposed laterally on articles adopting the rubber foot mounting structure of this invention, a friction force works sufficiently between a rubber foot and a side face of a boss hole, and accordingly, the rubber foot becomes hard to come out against the stress and becomes hard to rotate (hard to break).

Another optional aspect of the present invention provides the non-through hole acts as a relief of the rubber when the rubber foot gets inserted into the boss hole, making press-fit into the boss hole smooth.

Another optional aspect of the present invention, it is possible to suppress occurrence of shrinkage when the boss hole is molded with a resin etc. using a mold, and it becomes possible to minimize a variation in thickness at a part at which the boss hole is formed. Since the stress imposed on the bottom face of the rubber foot is received by the rib and the maximum thickness portion supports a member in which the boss hole is formed, a weight that the rubber foot bears does not impose on the ring-shaped depression and the non-through hole and it becomes possible to fully support the load.

One aspect of the present invention provides a projector that houses a video signal processing board for outputting a control signal based on an inputted electrical signal and an optical unit for projecting a video on a screen based on the control signal in an enclosure adopts a structure including: a pedestal that is molded with a resin and is capable of fastening the enclosure in a state of carrying the enclosure on it; a boss hole that is formed in the shape of substantially a cylinder on the undersurface of the pedestal with its opening facing downward; a rubber foot that is formed in the shape of substantially a column and is capable of being press-fit into the boss hole; a grid rib that stands at a predetermined height from a back surface corresponding to the bottom of the boss hole toward its opening and determines a depth of insertion of the rubber foot in the boss hole; a body section of the rubber foot formed in the shape of a column having an outside diameter slightly smaller than an internal diameter of the boss hole; a plurality of flanges each formed in the shape of a ring on the side face of the rubber foot having an outside diameter slightly larger than the internal diameter of the boss hole; a ring-shaped depression formed between the flange and the flange having a smaller outside diameter than the outside diameter of the body section; a slit that is formed on the side faces of the boss hole from the opening edge of the boss hole in an axial direction of the cylinder and exposes therethrough a part of the ring-shaped depression, and a not-through hole that is formed in the core along the axis of the substantially cylindrical rubber foot from the face of the rubber foot to be inserted into the boss hole to at least a part that substantially agrees with positions at which the plurality of flanges are formed, not as far as contacting the floor face of the rubber foot.

In this more concrete structure, it is natural that the same action as those of the aspects of the invention described above can be performed.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, Such variations and alternate embodiments are contemplated, and can be made without departing from the spirit and scope of the invention.

Hereafter, an embodiment of this invention will be described following an order described below.

(1) Outline configuration of projector:
(2) Structure of pedestal and rubber foot:
(3) Summary:
(1) Outline Configuration of Projector:

As an example of the electrical/electronic device that adopts the rubber foot mounting structure of this invention, this invention will be explained taking a projector placed on the pedestal as an example. However, this invention is not limited to this; this invention can be applied to various articles as long as each of them adopts the rubber foot mounting structure of this invention. For example, articles may be electric/electronic appliances, furniture, etc. without causing problems.

Figure 1:
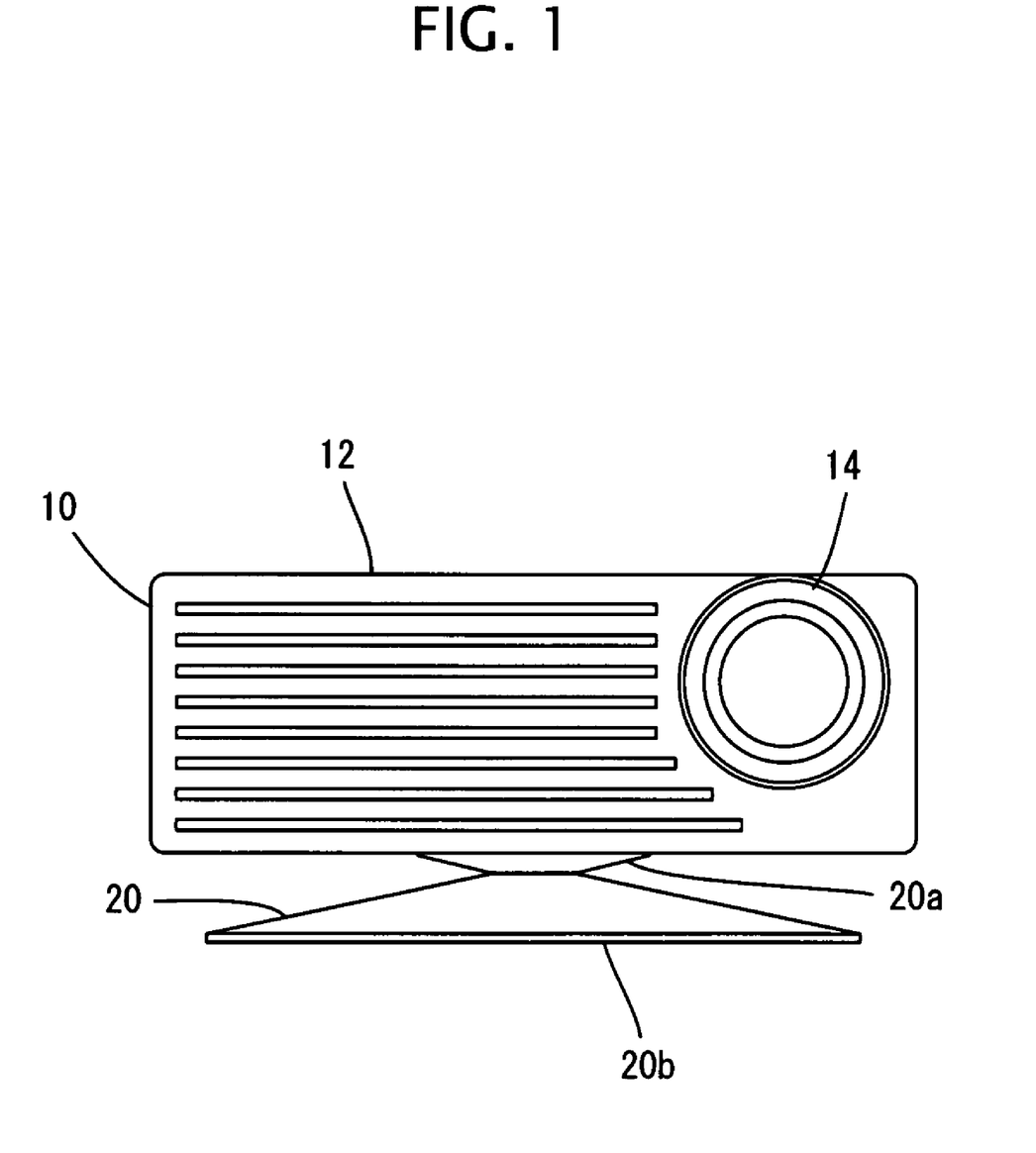
FIG. 1 is a front view of a projector according to this embodiment.

FIG. 1 shows a front view of a projector 10 according to this embodiment. In this figure, an enclosure 12 having an exposed projector lens 14 on its front face is carried and fixed on a movable part 20a of a pedestal 20, and the movable part 20a is supported rotatably by a base 20b. The movable part 20a and the base 20b are each in the shape of substantially a disc. The movable part 20a is formed in the shape of a bucket having a larger outer dimension with increasing height and the base 20b is formed in the shape of a composite volcano having a larger outer dimension with decreasing height. That is, a connection part of the movable part 20a and the base 20b is most constricted.

Figure 2:
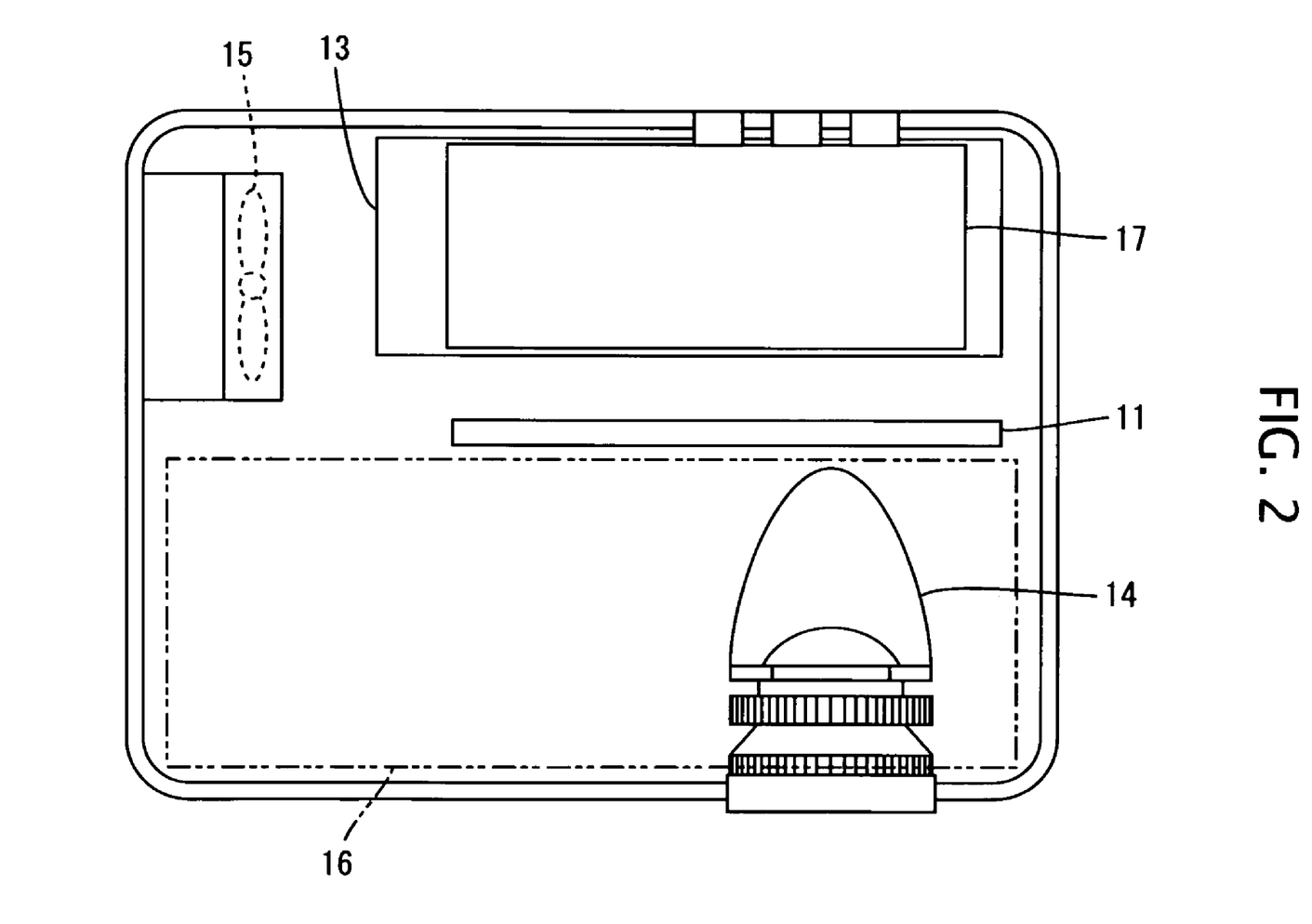
FIG. 2 is a top view of an internal structure of the projector as viewed from the above.

FIG. 2 is a top view showing an internal structure of the projector as viewed from the above. In this figure, the projector lens 14 is formed in the shape of substantially a cylinder and its back part is housed inside the enclosure 12. An optical unit including the projector lens 14 is provided inside the enclosure 12 of the projector 10, on a front side thereof. Inside the enclosure 12, the projector 10 has other components: a video signal processing board 11 for outputting a control signal based on an inputted electric signal, a power supply board 13, an air cooling fan 15, an input/output board 17 equipped with various connectors, etc.

Figure 3:
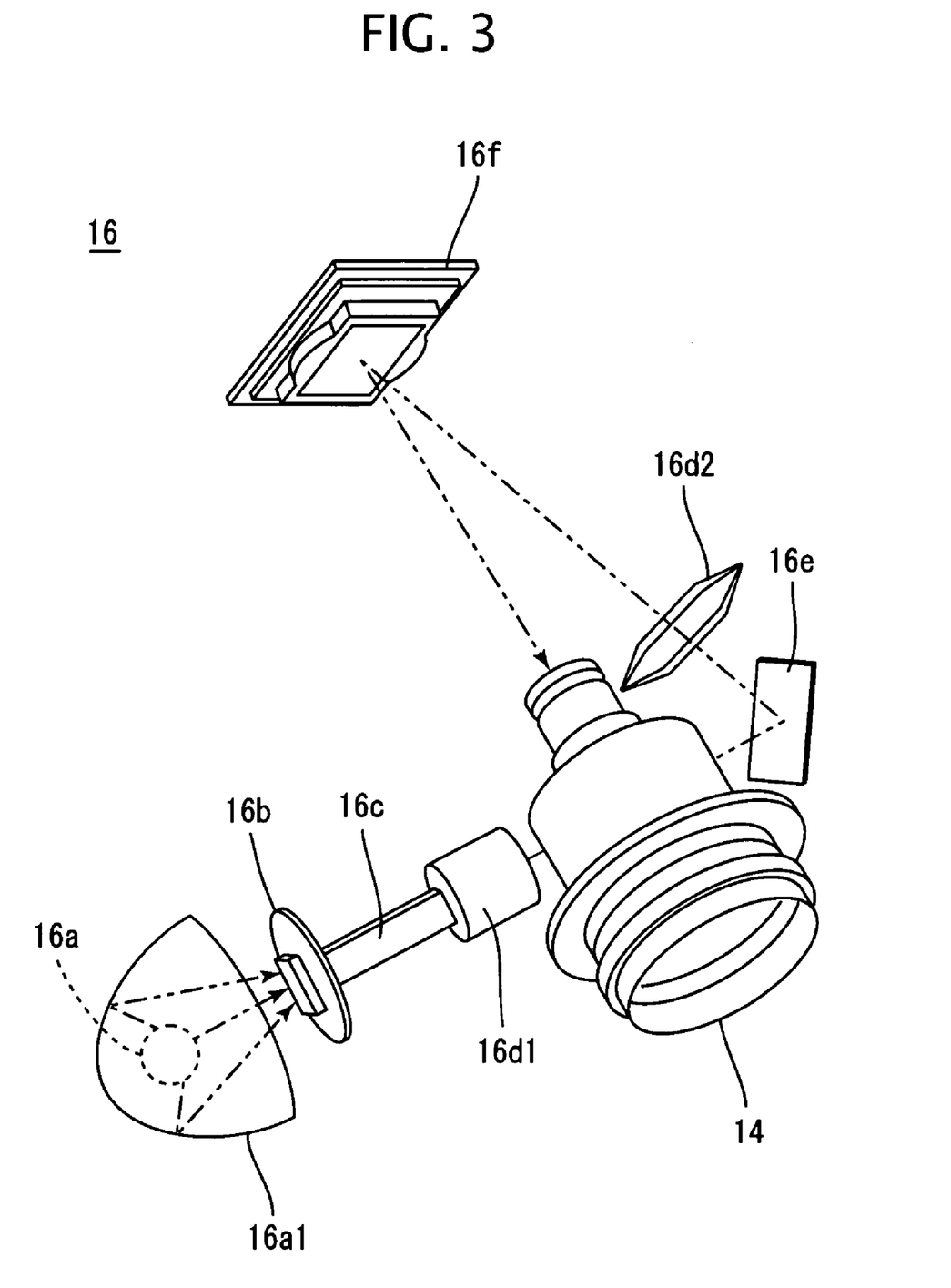
FIG. 3 is a diagram schematically showing a configuration of an optical unit.

FIG. 3 schematically shows a configuration of an optical unit 16. In this figure, the optical unit 16 generates projecting light, converts this projecting light into lights of RGB that are processed based on a video signal, and outputs the converted projecting lights to the projector lens 14. The optical unit 16 consists of a light source 16a, a color wheel 16b, a light pipe 16c, an illumination lens 16d, a mirror 16e, and a DMD (Digital Micromirror Device) 16f.

The light source 16a is disposed on a side in front of the enclosure 12 when the optical unit 16 is housed in the enclosure 12 and generates white light including wavelength components of RGB. Moreover, the light source 16a is equipped with a reflector 16a1 in the shape of a paraboloid that reflects light emitted from the light source backward and is configured to emit the light generated in the light source 16a toward the color wheel 16b. As the light source 16a, a halogen lamp, a metal halide lamp, a high pressure mercury vapor lamp, a xenon lamp, etc. can be used, for example. Moreover, as the reflector 16a1, a parabolic reflector, an ellipsoidal mirror, etc. can be used, for example.

The color wheel 16b has the shape of substantially a disc, is disposed substantially in parallel to the width direction of the enclosure 12, and more specifically three-color color filters of RGB are arranged at equal intervals. The color wheel 16b rotates a disc-shaped color filter composed of different spectroscopic filters each located in a predetermined angle range of the disc at a predetermined speed and transmits white light emitted from the light source 16a through the spectroscopic filters, whereby the light is separated lights of R, G, and B sequentially. The light pipe 16c is a pillar member whose sectional view is substantially a rectangle is orientated in the width direction of the enclosure 12, converts the light having passed through the color wheel 16b into substantially a collimated beam, and guides it to a mirror 16e that will be described later. Needless to say, in order to improve the contrast and enhance the brightness of whiteness, the color wheel 16b may use four-segmented color filter composed of white (transparent) besides RGB, or the color filter may be six colors composed of RGB plus yellow (Y), magenta (M), and cyan (C).

The mirror 16e is disposed in front of the enclosure 12 and at a side thereof, opposite to the light source 16a, and reflects a collimated beam emitted from a light pipe 16c to the above in the rear side and also to the opposite side in a width direction. The illuminations lens 16d1 is for focusing light from the light pipe 16c on the mirror 16e; an illumination lens 16d2 is for focusing light reflected from the mirror 16e on a DMD 16f.

The DMD 16f is disposed at a position to which the collimated beam reflected by the mirror 16e is irradiated and has a plurality of micro mirrors each as a modulation element for modulating light of each color of RGB for each pixel. The micro mirrors are arranged in a predetermined arrangement, and each of them is driven and controlled individually based on the RGB signal outputted from the video signal processing board 11 as a control signal, which enables the angle of reflection plane to be inclined by a predetermined angle (i.e., 12°). The DMD 16f varies the brightness of light reflected by the mirror 16e by time-division driving each of the micro mirrors based on the RGB signal. By this mechanism, the DMD 16f processes the projecting light and reflects it to the projecting lens 14 so as to form a predetermined video.

The projector lens 14 has an optical axis orientated toward the front of the enclosure 12 and is for enlarge-projecting image light modulated by the DMD 16f on a screen. The projector lens 14 is constructed as a combination of lenses in which a plurality of converging elements are arranged along a direction of the optical axis for the purpose of preventing blurriness of a projected image caused by chromatic aberration of each light of color of RGB etc.

An arrow of an alternate long and two short dashes line in FIG. 3 shows a propagation direction of the projecting light. Projecting light of white emitted from the light source 16a is separated into each light of color of RGB by the color wheel 16b. The separated projecting lights are collected by the light pipe 16c, and are guided to the mirror 16e. The projecting light emitted from the light pipe 16c is focused by an illumination lens 16d1 intervening between the light pipe 16c and the mirror 16e, is made incident on the mirror 16e, and is reflected backward by the mirror 16e. The projecting light reflected by the mirror 16e is converged by the illumination lens 16d2 and gets incident on the DMD 16f. Then the projecting light processed by the DMD 16f is enlarged and projected on a screen by the projector lens 14.

Figure 4:
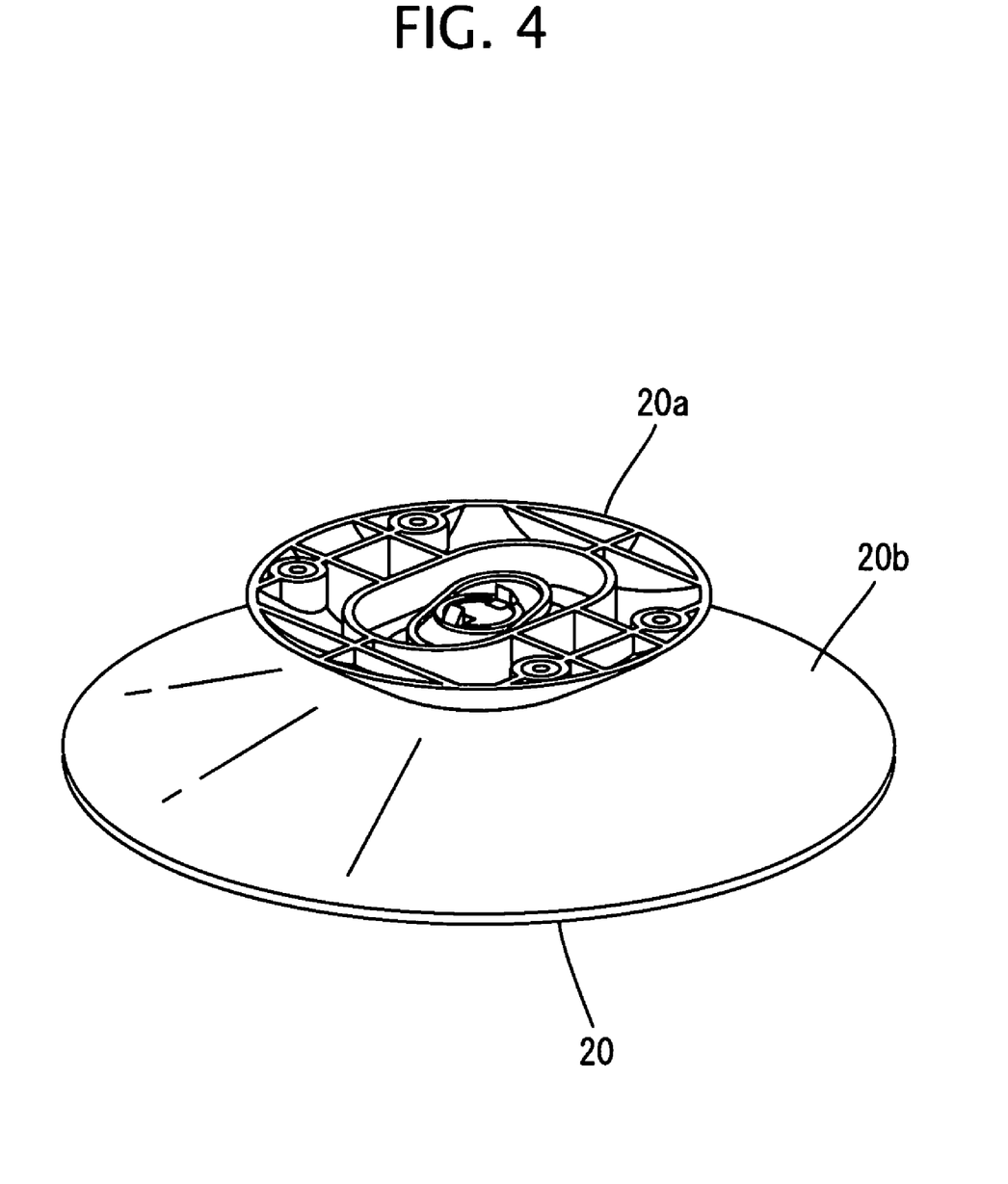
FIG. 4 is a perspective view of a pedestal as viewed from the above slantingly.
Figure 5:
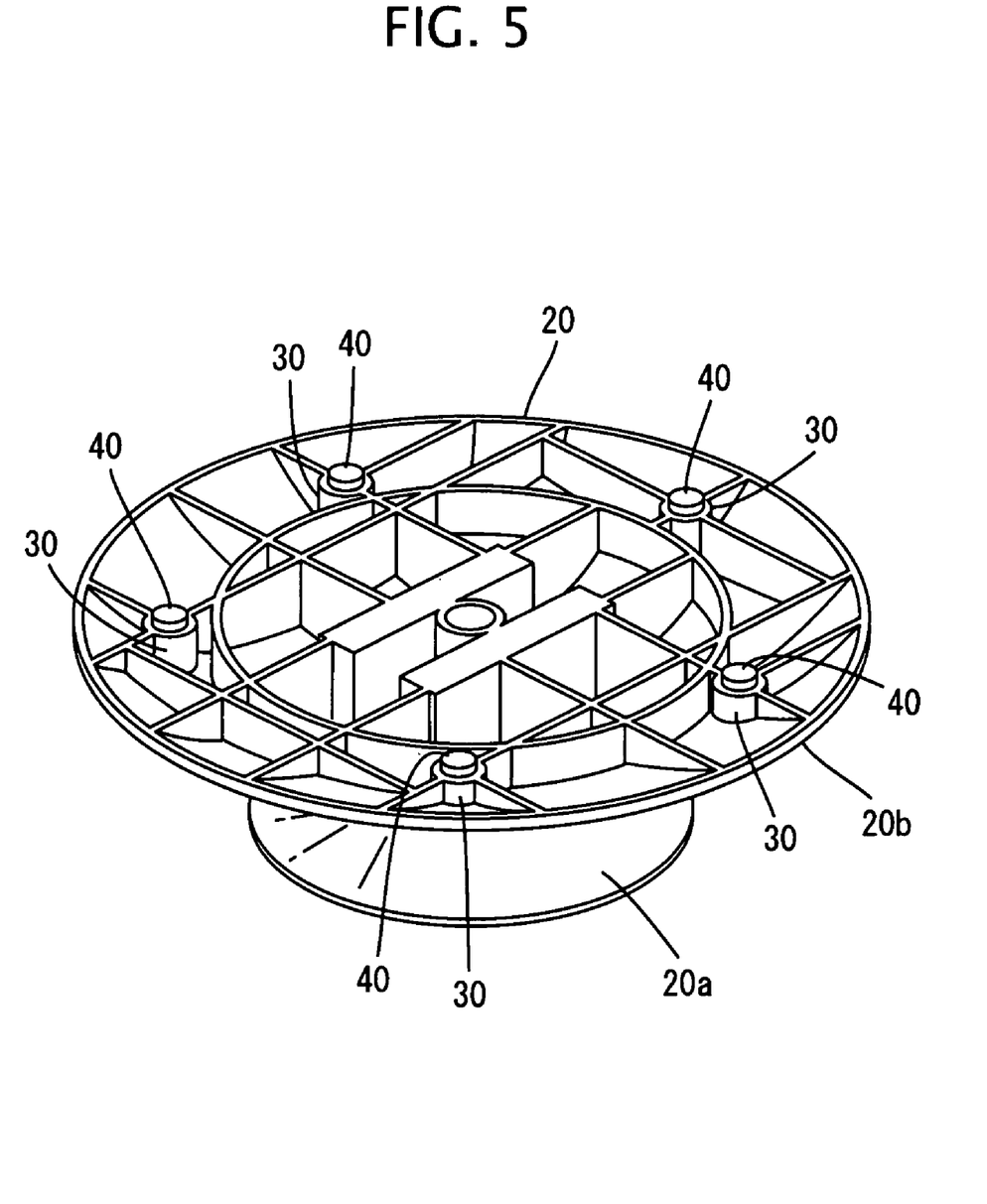
FIG. 5 is a perspective view of the pedestal as viewed from the below slantingly.
Figure 6:
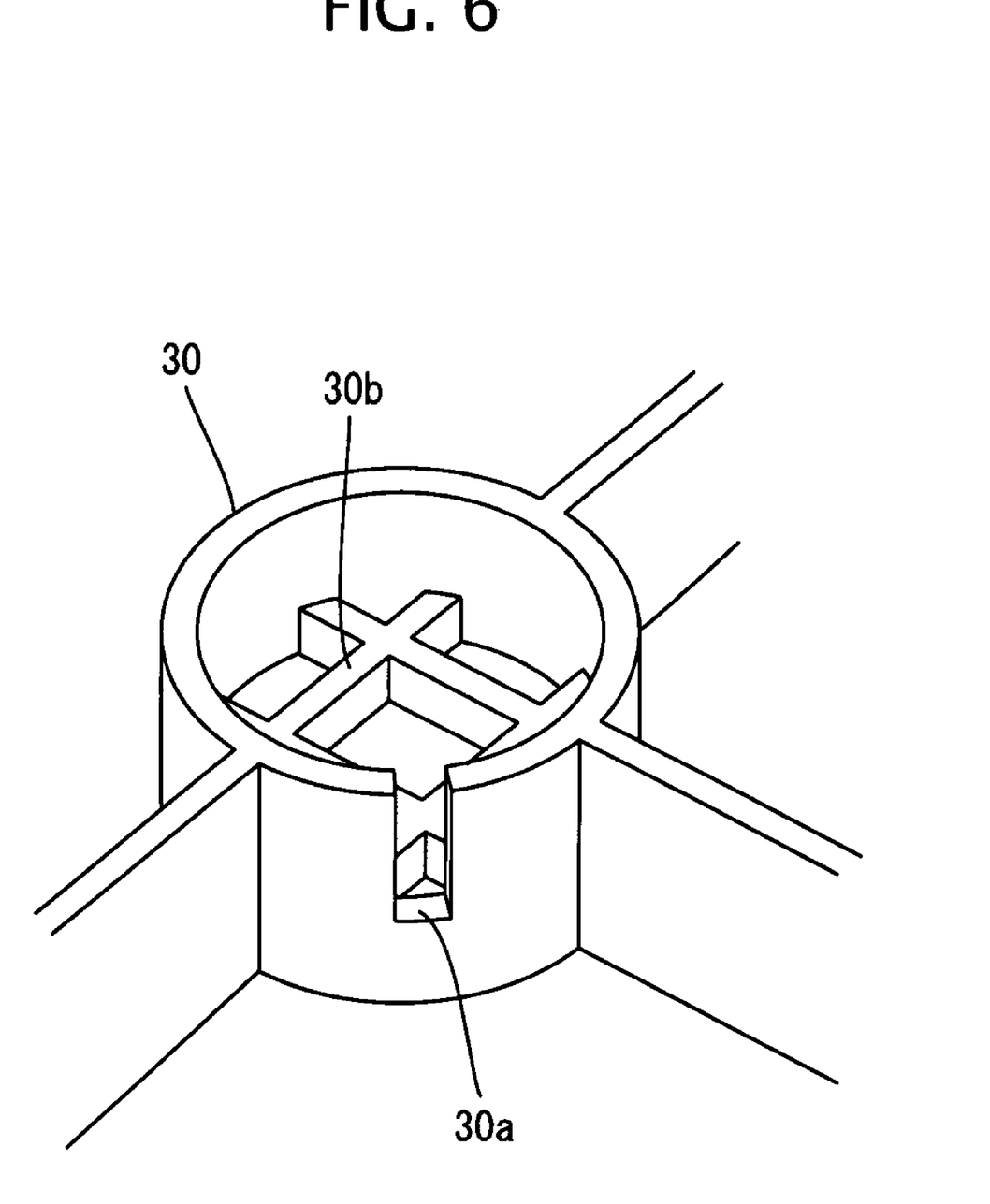
FIG. 6 is a partial enlarged perspective view of a boss hole formed on the bottom face of the pedestal.
Figure 7:
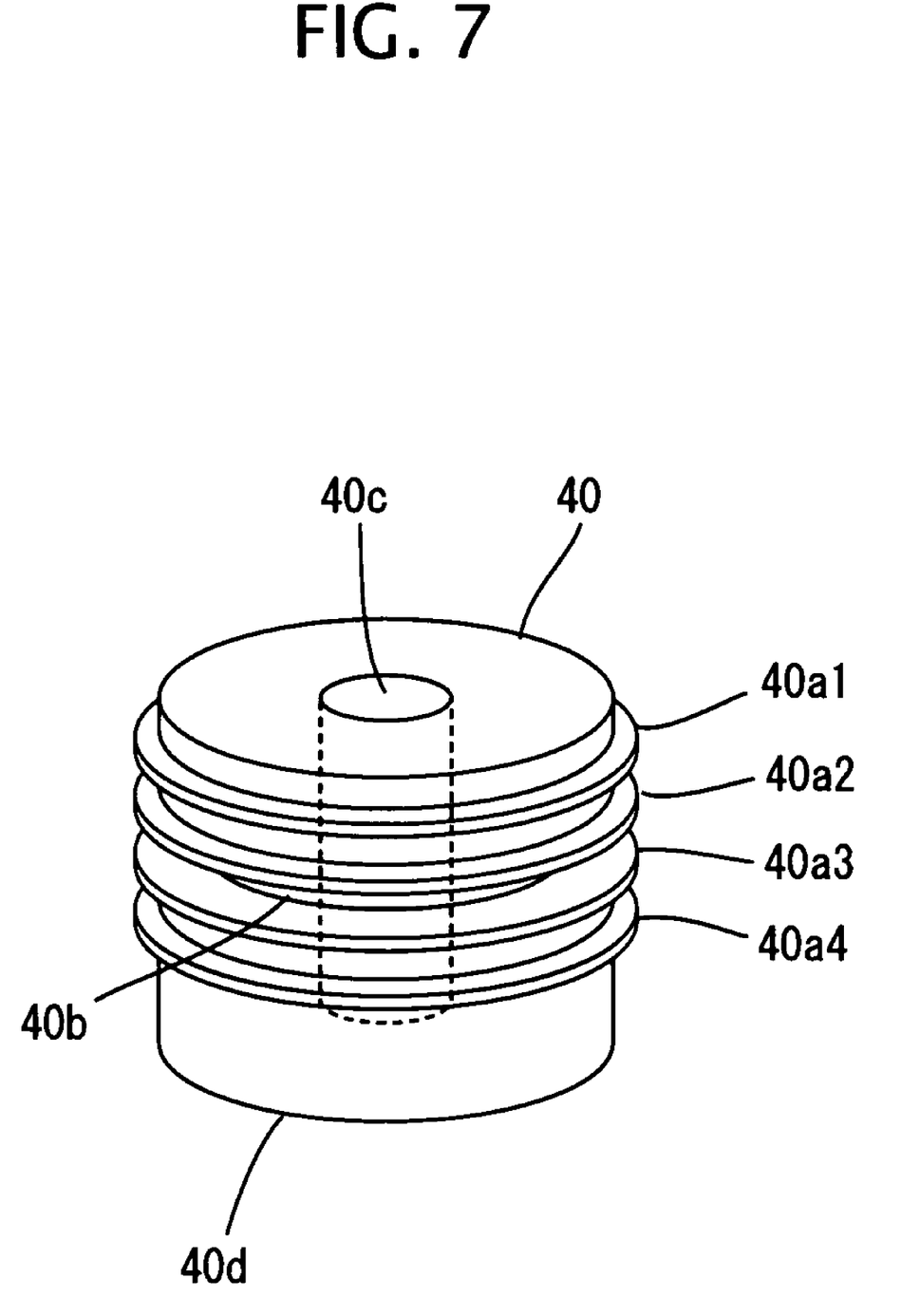
FIG. 7 is a perspective view of a rubber foot.
Figure 8:
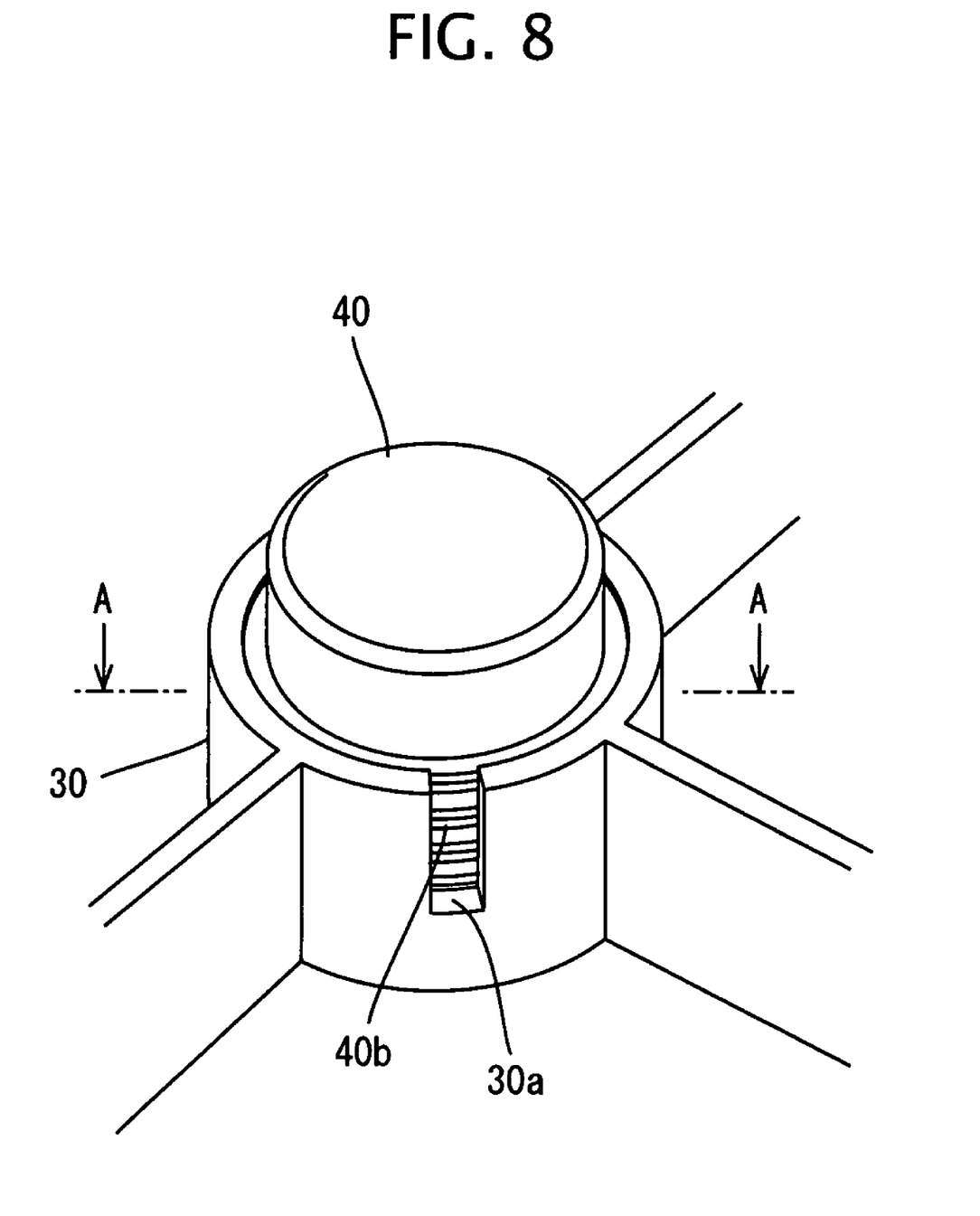
FIG. 8 is a perspective view of the rubber foot in a state of being mounted in the boss hole.
Figure 9:
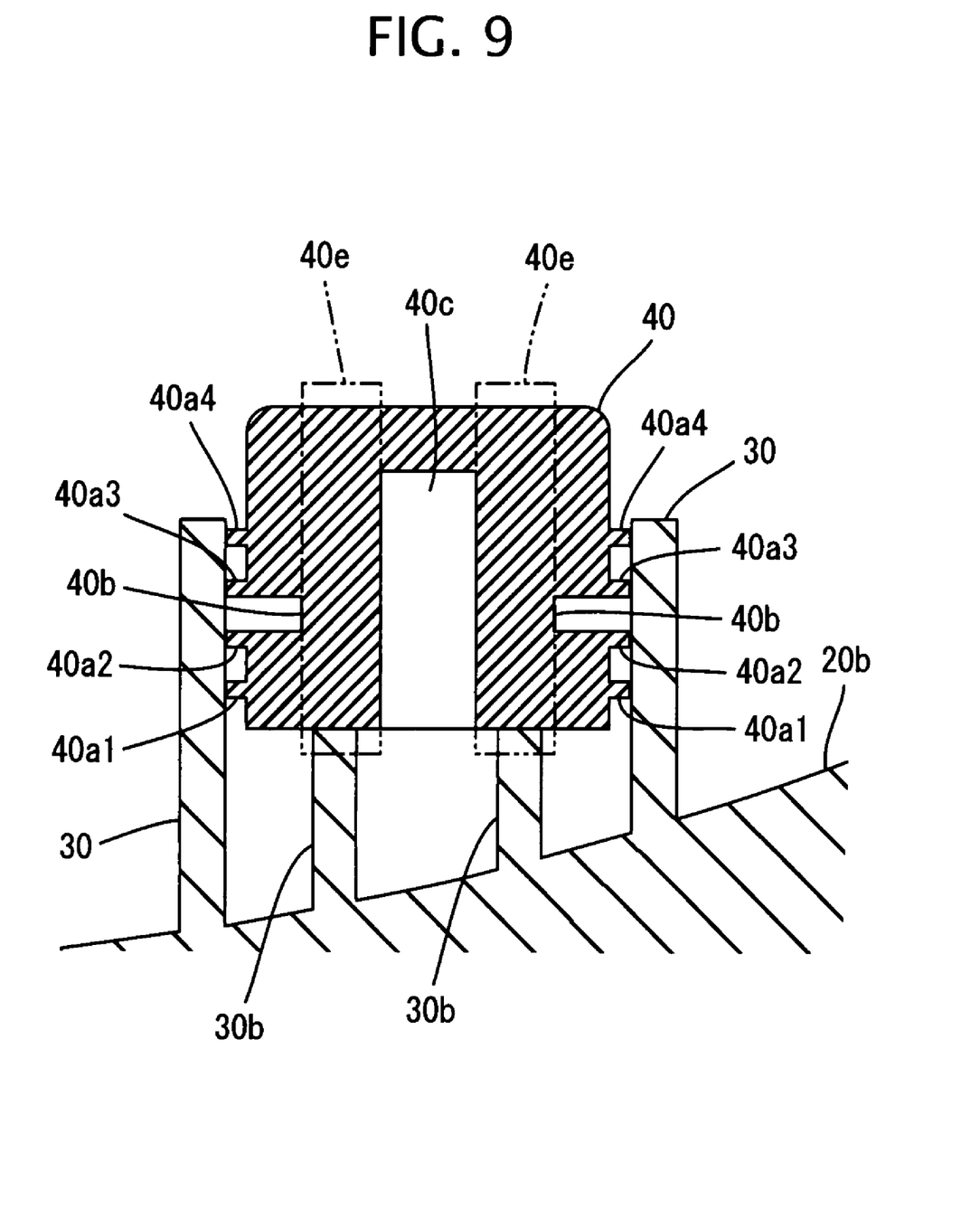
FIG. 9 is sectional view of the rubber foot taken along line A-A' in an axial direction of the rubber foot.

(2) Structures of Pedestal and Rubber Foot:

FIG. 4 shows a perspective view of the pedestal 20 as viewed from the above slantingly; FIG. 5 shows a perspective view of the pedestal 20 as viewed from the below slantingly; FIG. 6 shows a partial enlarged perspective view of a boss hole 30 formed on the bottom face of the pedestal 20; FIG. 7 shows a perspective view of a rubber foot 40; FIG. 8 shows a perspective view of the rubber foot 40 in a state of being mounted in the boss hole 30; and FIG. 9 shows a sectional view of the rubber foot 40 taken along line A-A' of FIG. 8 and an axial direction thereof.

The pedestal 20 is molded with a resin. A screw hole and a hook are formed on a clamp face of the movable part 20a for fixing the enclosure 12, so that the enclosure 12 can be fixed in a state of placing the enclosure 12 on the movable part 20a. A rib is formed in a grid manner on a face that will not expose when the enclosure 12 is clamped, and the grid rib reinforces and supports the screw hole and the viewable face. A rib is formed in a grid manner also on the undersurface of the base 20b, and reinforces and supports the viewable face of the base 20b and the boss hole 30. Five boss holes are formed substantially on the same circle at substantially equal intervals on the undersurface of the base 20b with each opening facing downward, and a rubber foot 40 is press-fit into each boss hole 30 and is mounted there. The base 20b in which the boss hole 30 was formed in this way corresponds to the enclosure equipped with the boss hole in the shape of substantially a cylinder.

The boss hole 30 is formed in the shape of substantially a cylinder and the cylinder part connects a plurality of ribs, which reinforce and support the boss hole 30. It is natural that, as the shape of the boss hole, cylindrical shapes of polygons, such as a rectangle and a hexagonal, may be used besides the substantially cylindrical shapes. On a side face of the substantially cylindrical cavity of the boss hole 30, a slit 30a is formed in the boss hole 30 from an opening edge in the axial direction of the cylindrical cavity and exposes therethrough the side face of the rubber foot 40 when the rubber foot 40 is mounted into the boss hole 30. Moreover, a grid rib 30b that stands to a predetermined height from a back surface corresponding to the bottom of the boss hole 30 toward the opening is formed. When the rubber foot 40 has been inserted to a predetermined depth, this structure restricts the rubber foot 40 not to be inserted beyond that depth by the grid rib 30b. That is, the grid rib 30b determines the depth of insertion of the rubber foot 40 in the boss hole 30.

The grid rib 30b is formed in parallel to a face on which the rubber foot 40 is inserted and such that a virtual surface formed by the end of the grid rib 30b make surface contact with a face on which the rubber foot 40 is inserted. Since a part that contacts the rubber foot 40 of the boss hole 30 is specified to be the grid rib 30b in this way, it becomes possible to suppress occurrence of shrinkage at the time of forming the base 20b and to minimize variation in the thickness of the base 20b. Therefore, this rubber foot mounting structure does not impair the beautiful appearance. That is, the grid rib 30b in contact with the rubber foot 40 corresponds to the rib.

The rubber foot 40 is formed substantially cylindrical and is made capable of being press-fit into the boss hole 30. That is, in FIG. 7, a body section 40d of the rubber foot 40 is formed in the shape of a column having an outside diameter slightly smaller than an internal diameter of the boss hole 30, and Four flanges 40a1, 40a2, 40a3, and 40a4 whose outside diameters are slightly larger than the internal diameter of the boss hole 30 that protrude outwardly in the ring shapes are formed to have equal intervals from the top in this order. Therefore, when mounting the rubber foot 40 into the boss hole 30, the flanges 40a1, 40a2, 40a3, and 40a4 are press-fit into the boss hole 30 while being compressed by the inner side face of the boss hole 30, and will be mounted and secured by a friction force between the flanges and the inner side face of the boss hole 30. That is, the flanges 40a1, 40a2, 40a3, and 40a4 correspond to a plurality of protrusions and correspond to flange-shaped protrusions.

Moreover, in FIG. 7, a ring-shaped depression 40b whose outside diameter is made smaller than the outside diameter of the body section 40d is formed between the flanges 40a2 and 40a3 of the rubber foot 40. In FIG. 7, a ring-shaped depression 40b is formed continuously from the undersurface of the flange 40a2 and continuously from the top face of the flange 40a3, respectively, and is made observable through the slit 30a. That is, as shown in FIG. 8, the slit 30a is formed from the opening edge of the boss hole 30 to a part lower than a formation position of the ring-shaped depression 40b, and accordingly exposes therethrough a part of the ring-shaped depression 40b. Therefore, in case where the base 20b becomes defective in a factory and there occurs necessity of rework in which the rubber foot 40 is removed, this structure makes it easy to remove the rubber foot and secure an area that a pair of tweezers contacts as wide as possible.

A non-through hole 40c is formed in the core from the face of the rubber foot 40 to be inserted into the boss hole 30 along the axis of the substantially cylindrical rubber foot. This non-through hole 40c is not formed as deep as contacting the floor face of the rubber foot 40, but is formed as deep as a part that substantially agrees with positions at which the flanges 40a1, 40a2, 40a3, and 40a4 are formed. Therefore, the non-through hole 40c acts as a relief of the rubber when the rubber foot 40 is press-fit into the boss hole, making the press-fit into the boss hole 30 smooth.

When the rubber foot 40 is mounted into the boss hole 30, the flange 40a4 substantially agrees with the opening edge of the boss hole 30, as shown in FIGS. 8 and 9, and the flange 40a4 serves as a standard to check whether the rubber foot 40 is inserted in the boss hole 30 sufficiently. That is, it becomes possible to use the flange 40a4 as a locating tool for determining whether the rubber foot 40 is inserted sufficiently. Since this structure provides the flange 40a4 at a position that substantially agrees with the opening edge of the boss hole 30, a friction force is made to work sufficiently between the rubber foot 40 and the side faces of the boss hole 30 when stress is added from the lateral side of the pedestal 20 at the time of using the pedestal 20; therefore, the rubber foot 40 is hard to come off against the stress and is hard to rotate (hared to be broken). That is, when the rubber foot 40 is mounted in the boss hole 30, the flange 40a4 acts as a locating tool for determining whether the rubber foot 40 is inserted sufficiently.

Moreover, the rubber foot mounting structure is so designed that upper and lower blocks sandwiching the ring-shaped depression 40b may have holding power between themselves and the side faces of the boss hole 30 with the blocks being at as large a distance as possible. By this design, when the block on a base side of the rubber foot 40 gets inserted into the boss hole 30, a holding force works between the flange 40a2 acting as a protrusion and the inner side faces of the boss hole 30. When the rubber foot 40 gets inserted further into the boss hole 30, a holding force will work between the flange 40a3 and the inner side faces of the boss hole 30. That is, since a gap between the flange 40a2 and the flange 40a3 sandwiching the ring-shaped depression 40b is secured to be wide, the both flanges do not contact each other at the time of inserting the rubber foot 40, and after it is press-fit, the both flanges incline to a ring-shaped depression 40b side, which improves a fixing force of the rubber foot 40.

Furthermore, the rubber foot 40 is so designed that the maximum thickness portion of the rubber may come to the grid part of the grid rib 30b formed on the bottom face of the boss hole 30. That is, when the rubber foot 40 is inserted sufficiently in the boss hole 30, a maximum thickness portion 40e of the rubber foot 40 contacts the grid rib 30b, as shown in FIG. 9. By this mechanism, the stress applied to the bottom face of the rubber foot 40 is received by the grid rib 30b, and the maximum thickness portion 40e supports the projector 10 and the pedestal 20. Therefore, the structure is one that imposes the load on neither the ring-shaped depression 40b nor the non-through hole 40c, and enables the rubber foot 40 to support the projector 10 and the pedestal 20 sufficiently. That is, the grid rib 30b contacts the rubber foot 40 at a part at which it directly receives the stress transmitted from the bottom face of the rubber foot 40. Therefore, it can be said that specifically, a part that directly receives the stress transmitted from the bottom face of the rubber foot 40 of the grid rib 30b corresponds to the rib.

Further, since the rubber foot 40 is provided with the ring-shaped depression 40b, the rubber foot mounting structure becomes a structure in which the rubber foot 40 is easy to deform against the load imposed on the rubber foot 40 vertically and thus the rubber foot 40 has a buffering function. Therefore, it also has an effect to protect the projector 10 and the pedestal 20.

(3) Conclusion:

The rubber foot mounting structure has the base 20*b* equipped with the boss hole 30 in the shape of substantially a cylinder, and the rubber foot 40 that is made capable of being press-fit into the boss hole 30 by means of the flanges 40*a*1 to 40*a*4 formed on the outer side face of the body section 40*d* in the shape of substantially a column, wherein the flanges 40*a*1 to 40*a*4 formed on the outer side face of the rubber foot 40 contact the boss hole 30 and the rubber foot 40 gets inserted into the boss hole 30 while the flanges 40*a*1 to 40*a*4 are being compressed.

As described above, the rubber foot mounting structure corresponding to this embodiment adopts a structure that consists of an enclosure equipped with a boss hole in a shape of substantially a cylinder; and a rubber foot that is press-fit into the boss hole by means of a plurality of protrusions formed on an outer side face of body section in a shape of substantially a column. That is, the plurality of protrusions formed on the outer side face of the rubber foot contact the boss hole and the rubber foot gets inserted into the boss hole while the plurality of protrusions is being compressed. Therefore, a frictional force will work between the plurality of protrusions and the boss hole and the rubber foot will be mounted into the boss hole and be secured. It is natural that, as the shape of the boss hole, cylindrical shapes of polygons, such as of a rectangle and a hexagonal, may be used other than substantially a cylinder.

Moreover, the protrusion may be formed in the shape of a flange. Since the protrusion is formed in the shape of a flange, the frictional force working between the boss hole and the rubber foot becomes symmetrical to the bottom face of the rubber foot, and accordingly an operation of setting the rubber foot into the boss hole becomes easy. In addition, this makes a shape of the mold for molding the rubber foot simple.

Furthermore, a ring-shaped depression may be formed between the protrusions each formed in the shape of a flange in the body section. When the ring-shaped depression is formed thus, the rubber foot mounting structure becomes a structure in which the rubber foot is easy to deform against the load imposed on the rubber foot vertically, and therefore will give the rubber foot a buffering function. Therefore, the rubber foot mounting structure of this invention has an effect to protect articles that adopt this structure, such as electric/electronic appliances and furniture.

Alternatively, the rubber foot mounting structure may be a structure in which a slit is formed on the side faces of the boss hole in the axial direction of the substantially cylindrical boss hole and the slit exposes a part of the ring-shaped depression. That is, the slit is formed from the opening edge of the boss hole to at least the formation position of the ring-shaped depression, and exposes therethrough a part of the ring-shaped depression. If being configured in this way, the slit enables the ring-shaped depression to be visually checked. If the material is found defective on its formation side of the boss hole in a factory and rework of removing the rubber foot occurs, it becomes easy to remove the member.

Moreover, if the ring-shaped depression is formed continuously from the undersurface of the flange-shaped depression located above the ring-shaped depression and continuously from the top side of the flange-shaped depression located below the ring-shaped depression, respectively, a plane having a length equal to a depression depth of the ring-shaped depression plus a protrusion height of the flange-shaped protrusion is formed, and therefore an area that tweezers contact, when the tweezers are inserted or similar operation in rework, can be secured as wide as possible.

Further, the rubber foot mounting structure may be so configured that, when the rubber foot is mounted in the boss hole, the protrusion located at an outermost position among the plurality of protrusions may act as a locating tool for determining whether the rubber foot is inserted sufficiently. That is, when the rubber foot is mounted to the boss hole, the composite structure is so formed that the protrusion may be located at an outermost position among the plurality of protrusions substantially agrees with the opening edge of the boss hole. This shape is suitable because it serves as a standard to check whether the rubber foot is inserted sufficiently in the boss hole. Since with this structure, especially when a flange-shaped member is adopted as the protrusion, the opening edge of the boss hole can be made a circular in contrast to substantially a disc of the flange face, it is possible to check troubles, such as a case where the rubber foot is inserted obliquely, and the rubber foot is inserted sufficiently on one side, while it is inserted insufficiently on the other side. Moreover, since the protrusion is provided at a position that substantially agrees with the opening edge of the boss hole, this structure makes a friction force work sufficiently between the rubber foot and the inner side face of the boss hole when stress is added laterally to articles that adopt the rubber foot mounting structure of this invention; therefore, the rubber foot is hard to come off against the stress and is hard to rotate (hard to break).

Furthermore, the rubber mounting structure may be such that a non-through hole is formed from a side facing the bottom face of the boss hole substantially in the axial direction of the substantially columnar rubber foot. That is, the non-through hole is formed in the core along the axis of the substantially columnar rubber foot from a face to be inserted into the boss hole of the rubber foot. The non-through hole is formed to at least a part that substantially agrees with positions at which the plurality of protrusions are formed, but not penetrating as far as contacting the floor face of the rubber foot. Therefore, the non-through hole acts as a relief of the rubber when the rubber foot is press-fit into the boss hole, making the press-fit of the rubber foot into the boss hole smooth.

Further, the following structure may be adopted: a rib that stands from the back surface of the boss hole toward its opening is formed in the boss hole so that the rib may contact the rubber foot at a part at which the rib directly receives the stress transmitted from the bottom face. Formation of the rib makes it possible, when the rubber foot is mounted and the rubber foot is inserted to a predetermined depth, to prevent the rubber foot from being inserted beyond that depth. That is, it can be said that the rib determines the depth of insertion of the rubber foot in the boss hole. Thus, since a part of the boss hole in contact with the rubber foot is specified to be the rib, when the boss hole is molded with a resin etc., occurrence of shrinkage can be suppressed and it becomes possible to minimize a variation in thickness of a part at which the boss hole is formed.

The above-mentioned word "directly" means that rubber of the rubber foot continuously exists between a point of application of the stress and the point of the stress being applied. That is, it means that neither the non-through hole nor the ring-shaped depression exists between the point of application of the stress and the point of the stress being applied. This expression (the part of the rib) can be put in another way as a part at which the rubber foot has maximum thickness of rubber between the bottom face of the rubber foot and the top side.

That is, the rubber foot mounting structure is so designed that a maximum thickness portion of the rubber foot may come to a contact position between the rubber foot and the rib formed on the bottom face of the boss hole. That is, when the rubber foot is inserted sufficiently in the boss hole, the maximum thickness portion of the rubber foot will contact the rib. By this mechanism, the stress imposed on the bottom face of the rubber foot is received by the rib and the maximum thickness portion supports a member on which the boss hole is formed. Therefore, the load is imposed on neither the ring-shaped depression nor the non-through hole.

A projector that adopts the rubber foot mounting structure of this invention based on the above structure is a projector that houses the video signal processing board for outputting the control signal based on the inputted electric signal and the optical unit for projecting a video on a screen based on the control signal adopts a structure that includes a pedestal that is molded with a resin and is capable of fastening the enclosure in a state of carrying the enclosure on the pedestal; a boss hole that is substantially cylindrical on an undersurface of the pedestal with the boss hole's opening facing downward; a rubber foot that is substantially cylindrical and is press-fit into the boss hole; a grid rib that stands at a predetermined height from a back surface corresponding to a bottom of the boss hole toward the opening and determines a depth of insertion of the rubber foot in the boss hole; a body section of the rubber foot that is formed in a shape of a cylinder having an outside diameter slightly smaller than an internal diameter of the boss hole; a plurality of flanges, each formed in a shape of a ring having an outside diameter slightly larger than the internal diameter of the boss hole on a side face of the rubber foot; a ring-shaped depression that is formed between the plurality of flanges having an outside diameter made smaller than the outside diameter of the body section; a slit that is formed on a side face of the boss hole from a edge of the opening in the axial direction of the cylinder and exposes therethrough a part of the ring-shaped depression; and a non-through hole that is formed in a core of the rubber foot from a plane that turn to the boss hole along the axis of substantially a cylinder and is formed from the plane to a part that substantially corresponding to position in which the plurality of flanges are formed at least.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A projector that houses a video signal processing board for outputting a control signal based on an inputted electric signal and an optical unit for projecting a video on a screen based on the control signal in an enclosure,
   comprising:
   a pedestal that is molded with a resin and is capable of fastening the enclosure in a state of carrying the enclosure on the pedestal;
   a boss hole that is substantially cylindrical on an undersurface of the pedestal with the boss hole's opening facing downward;
   a rubber foot that is substantially cylindrical and is press-fit into the boss hole;
   a grid rib that stands at a predetermined height from a back surface corresponding to a bottom of the boss hole toward the opening and determines a depth of insertion of the rubber foot in the boss hole;
   a body section of the rubber foot that is formed in a shape of a cylinder having an outside diameter slightly smaller than an internal diameter of the boss hole;
   a plurality of flanges, each formed in a shape of a ring having an outside diameter slightly larger than the internal diameter of the boss hole on a side face of the rubber foot;
   a ring-shaped depression that is formed between the plurality of flanges having an outside diameter made smaller than the outside diameter of the body section;
   a slit that is formed on a side face of the boss hole from a edge of the opening in the axial direction of the cylinder and exposes therethrough a part of the ring-shaped depression; and
   a non-through hole that is formed in a core of the rubber foot from a plane that turn to the boss hole along the axis of substantially a cylinder and is formed from the plane to a part that substantially corresponding to position in which the plurality of flanges are formed at least.

2. A rubber foot mounting structure comprising
   an enclosure equipped with a boss hole in a shape of substantially a cylinder;
   a rubber foot that is press-fit into the boss hole by means of a plurality of protrusions formed on an outer side face of body section of the rubber foot in a shape of substantially a column; and
   a non-through hole is formed in the body section from a side facing the bottom face of the boss hole substantially in an axial direction of the substantially cylindrical body section.

3. The rubber foot mounting structure according to claim 2, wherein
   the protrusion is formed in the shape of a flange.

4. The rubber foot mounting structure according to claim 3, wherein a ring-shaped depression is formed between the protrusions of the body section.

5. The rubber foot mounting structure according to claim 4, wherein a slit is formed on the side faces of the boss hole in an axial direction of substantially the cylinder and this slit exposes a part of the ring-shaped depression.

6. The rubber foot mounting structure according to claim 2, wherein, when the rubber foot is mounted in the boss hole, a protrusion located at an outermost position among the plurality of protrusion acts as a locating tool for determining whether the rubber foot is inserted sufficiently.

7. The rubber foot mounting structure according to claim 2, wherein a rib that stands from a back surface toward the opening of the boss hole is formed in the boss hole, and the rib contacts the rubber foot at a part at which the rib directly receives the stress transmitted from the bottom face of the rubber foot.

* * * * *